No. 615,896. Patented Dec. 13, 1898.
J. A. POCHÉ.
VACUUM INSULATOR FOR ELECTRIC CONDUCTORS.
(Application filed Oct. 6, 1898.)
(No Model.)
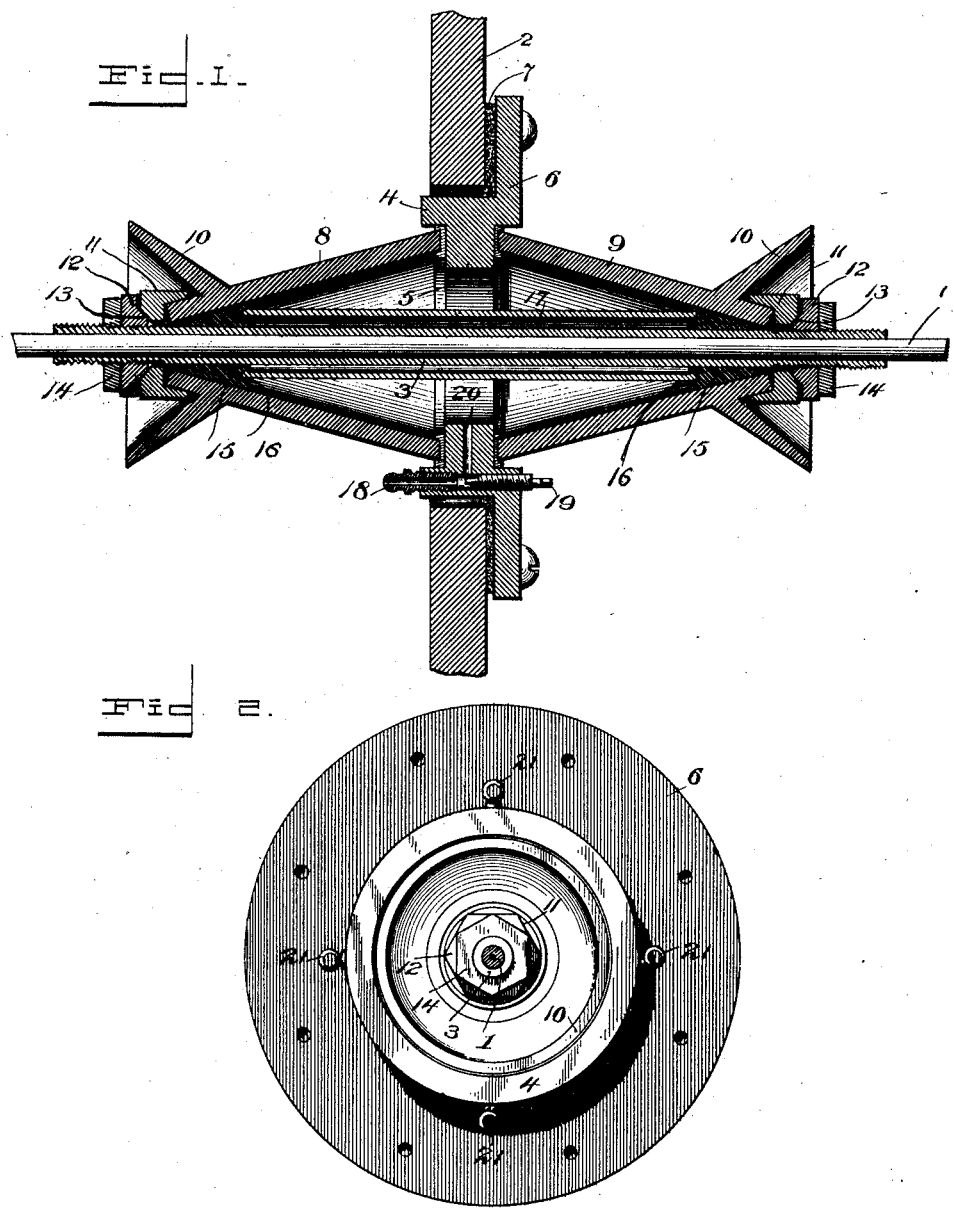

UNITED STATES PATENT OFFICE.

JOSEPH A. POCHÉ, OF NEW ORLEANS, LOUISIANA.

VACUUM INSULATOR FOR ELECTRIC CONDUCTORS.

SPECIFICATION forming part of Letters Patent No. 615,896, dated December 13, 1898.

Application filed October 6, 1898. Serial No. 692,844. (No model.)

*To all whom it may concern:*

Be it known that I, JOSEPH A. POCHÉ, a citizen of the United States, residing at New Orleans, in the parish of Orleans and State of Louisiana, have invented new and useful Improvements in Vacuum Insulators for Electric Conductors, of which the following is a specification.

This invention relates to a vacuum insulator for electric conductors, and is more especially designed for supporting and insulating wires carrying electric currents of high potential.

My present invention is in the nature of an improvement on the insulator for which Letters Patent No. 608,900 were granted to me on the 9th day of August, 1898. In said Letters Patent I showed and described an insulating-tube surrounding the conductor-wire and passing through a wall or partition, a collar at one end of the tube and a nut at the other end, and two truncated glass cones placed one on each side of the wall and provided with elastic gaskets in their bases pressed against the wall by the nut to form an air and water tight connection.

The object of the present invention is to increase the internal resistance of the insulator and to utilize the atmospheric pressure to aid in holding the parts together. It has for a further object to provide improved means for making the insulator air and water tight.

It also has for its object to provide improved means for protecting the exposed parts of the insulator against injury, and, finally, its purpose is to improve the construction and efficiency of this type of insulators generally.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a sectional view of my improved insulator, showing the same applied to a wall or divisional partition or casing. Figs. 2 and 3 are detail views.

Referring to the drawings, the numeral 1 indicates an electrical conductor—such, for example, as the prime conductor of any ordinary form of influence-machine. In the present instance the conductor is shown as passing through a wall, partition, or casing 2. Surrounding the conductor 1 is a metallic tube or sleeve 3, externally threaded at its opposite ends and of a length sufficient to extend for some distance upon each side of the wall or partition 2. Adapted to be fitted in an aperture in the wall or partition 2 is an annulus 4, having an internal circular bead or flange 5 and a peripheral flange 6, by means of which latter the annulus may be securely screwed or bolted to the wall or partition. In some cases it is desirable or necessary that the insulator be secured air and water tight in the wall or partition, and in such instances a packing-gasket 7, of any material suitable for the purpose, is clamped between the wall or partition and the flange 6. Surrounding the tube 3 and arranged on opposite sides of the annulus 4 are hollow truncated cones 8 and 9, formed of insulating material of any kind suitable for the purpose. As shown, the bases or larger ends of said cones are seated against the internal flange 5 of the annulus 4 and are packed air-tight in said annulus by a packing, preferably consisting of hemp cut into short lengths or fibers and mixed with red lead and boiled linseed-oil to form a plastic material approximately of the consistency of putty. A conical or outwardly-flaring flange 10 is formed externally on the smaller or outer end of each of the truncated cones 8 and 9, near the apex thereof, and in the space between the outer wall of the cone and the inner wall of the conical flange 10 is disposed a quantity of the plastic packing above described. A cup-shaped washer 11 is fitted over the apex of each of the cones 8 and 9 and at its inner end or edge embeds itself in and against the packing disposed between the cone and the annular flange 10, forming an air and water tight joint. A nut 12 is screwed over the threaded end of the tube or sleeve 3 and bears against the washer 11 and forces the latter to its seat against the end of the cone. Formed on the inner face of the nut 12 is a conical boss 13, that fits into a correspondingly-shaped aperture formed centrally in the washer 11, so that when the nut is turned up tightly against the washer said conical boss snugly and tightly fits the aperture in the washer and effectually prevents the entrance of air or water. Screwed over the sleeve 3 and against the nut 12 is a lock-nut 14, that operates in a well-known manner to prevent the nut 12 from accidentally becoming loose.

It will of course be understood that a washer 11 and nuts 12 and 14 are fitted over both ends of the sleeve 3 and engage the opposite ends or pieces of the cones 8 and 9 and that when the nuts are screwed up the ends of said cones and the joints about the sleeve 3 are not only thoroughly sealed up in the manner described, but that the bases or inner ends of the cones are also firmly pressed against the flange 5 of the annulus 4 and sealed air and water tight at this point likewise. Arranged in the opposite smaller ends of the cones 8 and 9 are conical plugs 15 of soft rubber, through which the sleeve 3 passes, and in the inner faces of said plugs are formed circular grooves or recesses 16, in which are fitted the opposite ends of a sleeve or tube 17, of suitable insulating material, that completely surrounds the sleeve 3, but is held out of contact therewith. The plugs 15 not only serve to hold the sleeve 17 in place, but also aid in sealing the ends of the cones 8 and 9.

Formed transversely in the annulus 5 is a threaded passage, in one end of which is screwed a nipple 18 and in the other a valve 19. A passage 20 is formed in the internal flange 5 and leads from the interior of the cones 8 and 9 to the valve-passage. The end of the valve 19, as shown, is adapted to be closed against a seat formed on the inner end of the nipple 18.

In practice after the parts have been secured in place in the manner above described the nipple 18 is connected to the suction-pipe of an air-pump, and the valve 19 having been opened the air is exhausted from the cones 8 and 9 until a high vacuum is formed therein, after which the valve is firmly screwed against its seat and the air-pump disconnected. The purpose of the high vacuum is to increase the internal resistance of the insulator and to utilize the atmospheric pressure as an aid in holding the cones together. The conical flanges on the ends of the cones not only form seats for the packing, against which the washers 11 impinge, but they also form effectual guards which protect the washers and nuts and prevent their accidental displacement or injury to the joints.

By means of the flanged annulus between the bases of the cones the insulator may be applied to a variety of uses—as, for example, to the casings of influence-machines, to the shells of vacuum-pans, to boiler-casings, partition-walls, floorings, ceilings, and numerous other places—and by providing the annulus with eyebolts 21 the insulator may be readily suspended from an aerial line in an obvious manner.

Having described my invention, what I claim is—

1. An insulator for electric conductors, consisting of a sleeve through which the conductor is adapted to pass, and a chamber surrounding said sleeve and secured thereon air-tight, said chamber being exhausted of air to create a high vacuum therein and form an internal resistance in the insulator, substantially as described.

2. An insulator for electric conductors, consisting of a sleeve adapted to inclose the conductor, a chamber surrounding said sleeve and secured thereon air-tight, and means through which the air may be exhausted from said chamber to create a high vacuum therein and form an internal resistance in the insulator, substantially as described.

3. An insulator for electric conductors, consisting of a sleeve through which the conductor is adapted to pass, an internally-flanged annulus surrounding said sleeve, two hollow, truncated cones of insulating material having their bases fitted air-tight to said flanged annulus and their apices fitted air-tight to the sleeve, and means for exhausting the air from the interior of the cones to create an internal resistance in the insulator and aid in holding the cones in place by atmospheric pressure, substantially as described.

4. An insulator for electric conductors, consisting of a sleeve through which the conductor is adapted to pass, an internally-flanged annulus surrounding said sleeve, two hollow truncated cones of insulating material having their bases fitted air-tight to said flanged annulus and their apices fitted air-tight to the sleeve, yielding conical plugs fitted in the opposite ends of the cones and having circular recesses in their inner faces, and a tube of insulating material surrounding said sleeve but out of contact therewith, said tube at its ends being fitted in the recesses in the plugs, substantially as described.

5. An insulator for electric conductors, consisting of a sleeve through which the conductor is adapted to pass, an internally-flanged annulus surrounding said sleeve, two hollow truncated cones of insulating material having their bases fitted air-tight to said flanged annulus and their apices fitted air-tight to the sleeve, a valved passage in the annulus communicating at one end with the interior of the cones and a nipple in the other end of said passage for the attachment of an air-pump, whereby the air may be exhausted from the insulator, substantially as described and for the purpose specified.

6. An insulator for electric conductors, consisting of an externally-threaded sleeve through which the conductor is adapted to pass, an internally-flanged annulus surrounding said sleeve, two hollow truncated cones of insulating material abutting at their bases the opposite sides of the flanged annulus and having their apices surrounding the opposite end portions of the sleeve, outwardly-flaring conical flanges formed on the outer end portions of the cones, packing arranged in the bottoms of said flanges, cup-shaped washers arranged over the ends of the cones and impinging against said packing, and nuts screwed over the threaded ends of the sleeve for forcing the washers to their seats and the cones against the flanged annulus, substantially as described.

7. An insulator for electric conductors, consisting of an externally-threaded sleeve through which the conductor is adapted to pass, an internally-flanged annulus surrounding said sleeve, two hollow truncated cones of insulating material abutting at their bases the opposite sides of the flanged annulus and having their apices surrounding the opposite end portions of the sleeve, outwardly-flaring conical flanges formed on the outer end portions of the cones, packing arranged in the bottoms of said flanges, cup-shaped washers arranged over the ends of the cones and provided centrally with conical apertures, and nuts screwed over the threaded ends of the sleeves and provided with conical bosses arranged to fit the conical apertures in the washers, substantially as described, and for the purpose specified.

8. An insulator for electric conductors, consisting of a sleeve through which the conductor is adapted to pass, two hollow truncated cones of insulating material arranged about said sleeve with their bases in juxtaposition, an internally-flanged annulus arranged air-tight between said bases, means for sealing the outer ends of the cones air-tight about the sleeve, and a peripheral flange on the annulus for attaching the insulator in place in an aperture in a wall or the like, substantially as described.

In testimony whereof I have hereunto set my hand in presence of two subscribing witnesses.

JOSEPH A. POCHÉ.

Witnesses:
W. H. COOK,
WALTER CASTANEDO.